United States Patent
Kim et al.

(10) Patent No.: US 10,903,950 B2
(45) Date of Patent: Jan. 26, 2021

(54) METHOD AND APPARATUS FOR TRANSMITTING UPLINK TRANSPORT BLOCK IN WIRELESS COMMUNICATION SYSTEM

(71) Applicant: LG Electronics Inc., Seoul (KR)

(72) Inventors: Bonghoe Kim, Seoul (KR); Ilmu Byun, Seoul (KR); Joonkui Ahn, Seoul (KR); Sukhyon Yoon, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/485,209

(22) PCT Filed: Mar. 16, 2018

(86) PCT No.: PCT/KR2018/003076
§ 371 (c)(1),
(2) Date: Aug. 12, 2019

(87) PCT Pub. No.: WO2018/174473
PCT Pub. Date: Sep. 27, 2018

(65) Prior Publication Data
US 2019/0394000 A1 Dec. 26, 2019

Related U.S. Application Data

(60) Provisional application No. 62/473,475, filed on Mar. 19, 2017.

(51) Int. Cl.
*H04L 5/00* (2006.01)

(52) U.S. Cl.
CPC .......... *H04L 5/0046* (2013.01); *H04L 5/0007* (2013.01); *H04L 5/0094* (2013.01)

(58) Field of Classification Search
CPC .... H04L 5/0046; H04L 5/0007; H04L 5/0094
USPC .......................................................... 370/330
See application file for complete search history.

(56) References Cited

U.S. PATENT DOCUMENTS

| | | |
|---|---|---|
| 2010/0050034 A1 | 2/2010 | Che et al. |
| 2014/0198758 A1 | 7/2014 | Nimbalker et al. |
| 2015/0256296 A1 | 9/2015 | Hsieh |
| 2016/0204907 A1 | 7/2016 | Chen et al. |
| 2017/0171739 A1* | 6/2017 | Suzuki ................. H04W 72/06 |
| 2019/0149380 A1* | 5/2019 | Babaei ............... H04L 27/2613 370/330 |

(Continued)

OTHER PUBLICATIONS

International Search Report of Appl'n No. PCT/KR2018/003076, dated Jun. 18, 2018.

(Continued)

*Primary Examiner* — Peter G Solinsky
(74) *Attorney, Agent, or Firm* — Dentons US LLP

(57) ABSTRACT

A method and device for transmitting a transport block in a wireless communication system is provided. Particularly, a terminal receives, from a base station, information on the number of subcarriers in a partial band included in an allocated carrier. The terminal distributes a soft buffer possessed by the terminal in proportion to the number of subcarriers in the partial band. The terminal determines a transport block size for each partial band according to the size of the distributed soft buffer. The terminal transmits, to the base station, the transport block within the transport block size.

13 Claims, 8 Drawing Sheets

(56) References Cited

U.S. PATENT DOCUMENTS

2019/0273582 A1* 9/2019 Yeo ...................... H04L 1/1812

OTHER PUBLICATIONS

Huawei et al., "On DL Multiplexing of URLLC and eMBB Transmissions," R1-1701663, 3GPP TSG RAN WG1 Meeting #88, Athens, Greece, Feb. 7, 2017, see section 2; and figure 1.
NEC, "Numerology Indication for a Mixed Numerology Carrier," R1-1701979, 3GPP TSG RAN WG1 Meeting #88, Athens, Greece, Feb. 6, 2017, see sections 1, 2.1; and figure 2.

* cited by examiner

METHOD AND APPARATUS FOR TRANSMITTING UPLINK TRANSPORT BLOCK IN WIRELESS COMMUNICATION SYSTEM

CROSS-REFERENCE TO RELATED APPLICATIONS

This application is the National Stage filing under 35 U.S.C. 371 of International Application No. PCT/KR2018/003076, filed on Mar. 16, 2018, which claims the benefit of U.S. Provisional Application No. 62/473,475 filed on Mar. 19, 2017, the contents of which are all hereby incorporated by reference herein in their entirety.

BACKGROUND OF THE INVENTION

Field of the Invention

This specification relates to wireless communication and, most particularly, to a method for transmitting an uplink transport block in a wireless communication system and an apparatus (or device) using the same.

Related Art

A wireless communication system is widely deployed to provide various types of communication services, such as voice and data. An object of a wireless communication system is to enable a plurality of terminals to perform reliable communication regardless of their locations and mobility.

A requirement of a next-generation wireless communication system is to accommodate significantly explosive data traffic, to increase a dramatic increase in a transfer rate per user, to accommodate the significantly increased number of connected devices, and to support a very low end-to-end (E2E) latency and high energy efficiency. For this, there is ongoing research on various techniques such as dual connectivity, massive multiple input multiple output (MIMO), in-band full duplex, non-orthogonal multiple access (NOMA), super wideband support, device networking, or the like.

A base station (BS) properly allocates radio resources to each piece of user equipment (UE) within a cell through scheduling. The UE may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a mobile communication system, data is transmitted/received through a resource allocation process based on BS scheduling to maximize resource utilization, which may lead to an increase in latency of uplink data transmission of a UE. Accordingly, a method of performing a multi-level scheduling request is proposed to minimize the latency of the UE.

SUMMARY OF THE INVENTION

Technical Objects

This specification provides a method and apparatus for transmitting an uplink transport block in a wireless communication system.

Technical Solutions

This specification proposes a method and apparatus (or device) for transmitting an uplink transport block in a wireless communication system.

The device (or apparatus) includes a transceiver transmitting and receiving radio signals and a processor being operatively connected to the transceiver.

This exemplary embodiment proposes a method of efficiently splitting (or dividing), by a UE being connected to multiple partial bands or carriers, a soft buffer for carriers and partial bands. The UE may be allocated with at least one carrier, and the specific carrier may include at least one partial band. If the number of partial bands is equal to 1, it may be understood that the specific carrier is not split (or divided) to partial bands.

The UE receives information on the number of subcarriers in a partial band being included in the allocated carrier from the base station. The number of subcarriers in the partial band may be explicitly or implicitly received from the base station via higher layer signaling.

The UE may distribute a soft buffer included in the UE in proportion to the number of subcarriers of the partial band. For example, if the partial band includes a first partial band and a second partial band, the soft buffer may be distributed based on the number of subcarriers in the first partial band and the number of subcarriers in the second partial band.

The UE determines a transport block size per partial band based on the distributed soft buffer size. The transport block size may correspond to a maximum transport block size that can be transmitted from the partial band.

The UE transmits a transport block to the base station within the determined transport block size.

If the bandwidth of the partial band is constant whereas a gap between the subcarriers increases, the number of subcarriers of the partial band may be decreased. Accordingly, the soft buffer size being distributed to the partial band is decreased, and the transport block size being transmitted from the partial band may be decreased.

If the bandwidth of the partial band is increased whereas a gap between the subcarriers is constant, the number of subcarriers of the partial band may be increased. Accordingly, the soft buffer size being distributed to the partial band is increased, and the transport block size being transmitted from the partial band may be increased.

In case the partial band includes a first partial band and a second partial band, a sum (or combination) of a bandwidth of the first partial band and a bandwidth of the second partial band may be equal to or larger than the bandwidth of the carrier. In this case, the first partial band and the second partial band may be processed with Frequency Division Multiplexing (FDM).

In case the partial band includes a first partial band and a second partial band, a sum (or combination) of a number of subcarriers in the first partial band and a number of subcarriers in the second partial band may be equal to or larger than the number of subcarriers in the carrier. In this case, the first partial band and the second partial band may overlap one another. For example, the first partial band may support enhanced Mobile BroadBand (eMBB) services, and the second partial band may support Ultra-Reliable and Low Latency Communications (URLLC) services. More specifically, the first partial band may correspond to a partial band dedicated to eMBB services using only part of the entire band, and the second partial band may correspond to a partial band dedicated to URLLC, which may use the entire band. The entire band may correspond to the entire carrier band being allocated to the UE.

Additionally, the soft buffer belonging to the UE may be distributed in proportion to a number of Orthogonal Frequency Division Multiplexing (OFDM) symbols being scheduled in the partial band. More specifically, if a gap between the subcarriers and the bandwidth are constant, the soft buffer size or maximum transport block size may vary (or change) in proportion to the number of symbols, which corresponds to units for performing scheduling of the partial band. The number of OFDM symbols being scheduled in the partial band may be received via higher layer signal.

Additionally, the soft buffer belonging to the UE may be distributed in proportion to a number of Hybrid Automatic Repeat request (HARQ) processes of the partial band. The number of HARQ processes may be received via UE-specific signal.

Additionally, the soft buffer belonging to the UE may be distributed in proportion to a maximum number of information bits being supported by a maximum modulation scheme of the partial band. For example, in case the maximum modulation scheme of the first partial band is 1024QAM and the maximum modulation scheme of second partial band is 256QAM, a maximum of 10-bit information may be transmitted from 1 RE in the first partial band, and a maximum of 8-bit information may be transmitted from 1 RE in the second partial band. Therefore, under the same condition, among the entire soft buffer, $10/18$ of the buffer is allocated to the first partial band, and $8/18$ of the buffer is allocated to the second partial band.

Additionally, the soft buffer belonging to the UE may be distributed in inverse proportion to a minimum coding rate being applied to the partial band. The minimum coding rate may be received via UE-specific signal. Furthermore, the UE may distribute the soft buffer based on the minimum coding rate as well as the maximum coding rate or the reference coding rate.

In case multiple carrier are allocated from the base station, the soft buffer belonging to the UE may be distributed in proportion to the number of subcarriers of the carrier before the soft buffer is distributed in proportion to the number of subcarriers of the partial band. More specifically, after the UE distributes its soft buffer to each carrier, the UE may re-distribute the soft buffer per partial band.

The UE may be simultaneously connected to a first communication system and a second communication system. The first communication system may correspond to a 5G NR system, and the second communication system may correspond to an LTE system. Based on a number of cells being configured to the first communication system and a number of cells being configured to the second communication system, the soft buffer belonging to the UE may be distributed to each of the first communication system and the second communication system.

At this point, the number of cells being configured to the first communication system may be acquired based on a bandwidth that is supported by the first communication system. And, the number of cells being configured to the second communication system may be acquired based on a bandwidth that is supported by the second communication system. Since the 5G NR system supports a wider bandwidth than the LTE system, the number of cells being configured to the first communication system may be greater than the number of cells being configured to the second communication system.

Effects of the Invention

When using the proposed method, by efficiently splitting a soft buffer, which is reserved by a user equipment (UE), to each carrier and partial band, a transmission rate of the UE may be increased or a size of a soft buffer that shall be reserved by the UE may be reduced.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present invention are not limited thereto.

Figure 1:
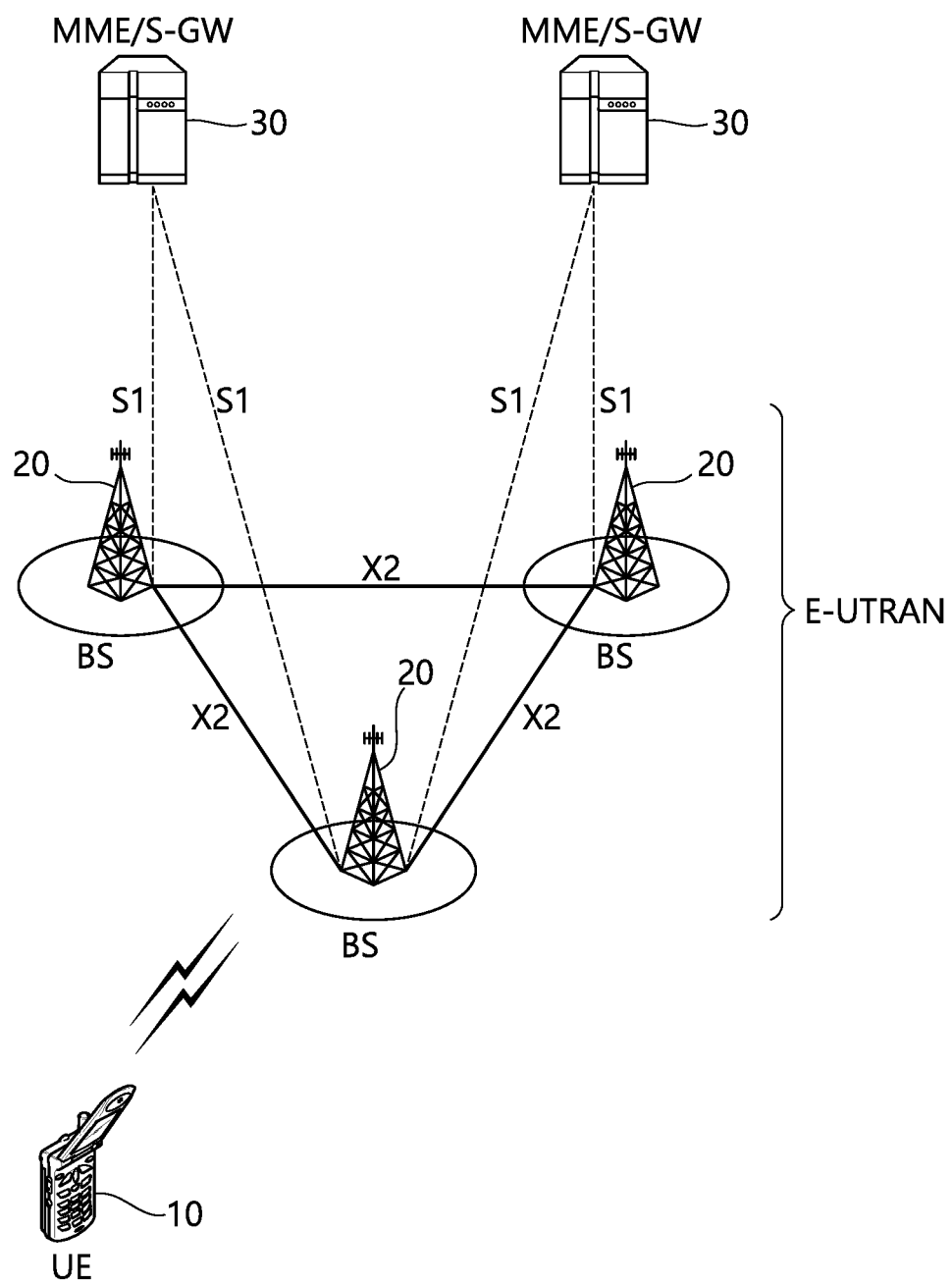
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) (20) which provides a control plane and a user plane to a user equipment (UE) (10). The UE (10) may be fixed or mobile, and may be referred to as another terminology, such as a mobile station (MS), a user terminal (UT), a subscriber station (SS), a mobile terminal (MT), a wireless device, etc. The BS (20) is generally a fixed station that communicates with the UE (10) and may be referred to as another terminology, such as an evolved node-B (eNB), a base transceiver system (BTS), an access point, etc.

The BSs (20) are interconnected by means of an X2 interface. The BSs (20) are also connected by means of an S1 interface to an evolved packet core (EPC) (30), more specifically, to a mobility management entity (MME) through S1-MME and to a serving gateway (S-GW) through S1-U.

The EPC (30) includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
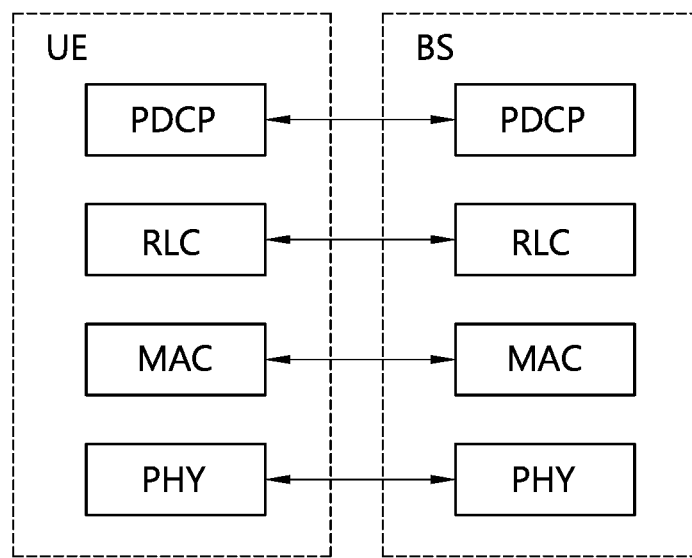
FIG. 2 is a diagram illustrating a radio protocol architecture for a user plane.
Figure 3:
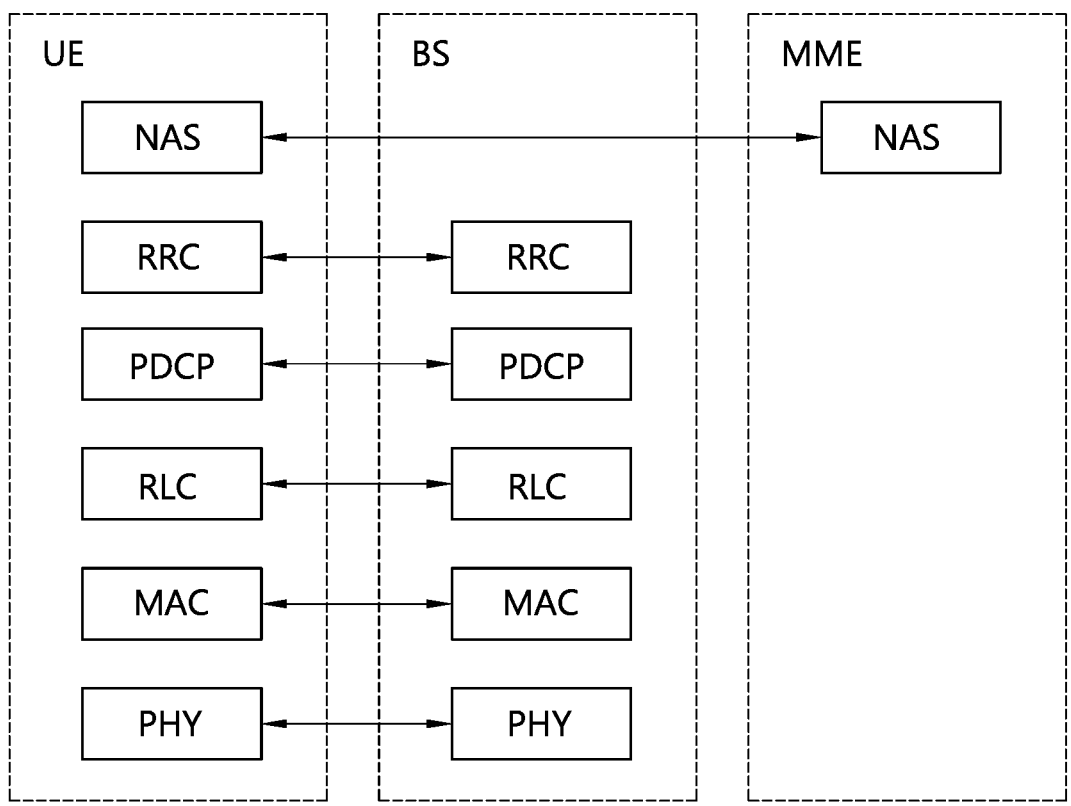
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIG. 2 and FIG. 3, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Hereinafter, semi-persistent scheduling (SPS) is described.

In a next-generation communication system, the SPS is required for a plurality of UEs. An Internet of Things (IoT) service of various industries is expected to be introduced in the next-generation communication system. Representative examples thereof include an automobile, a drone, or the like. In these services, location information is expected to be updated in unit of 100 millisecond (ms) to 1 second (s) to manage autonomous driving and to prevent accidents. When the location information is updated periodically, the SPS is applied in general to decrease an overhead of an unnecessary control channel.

Figure 4:
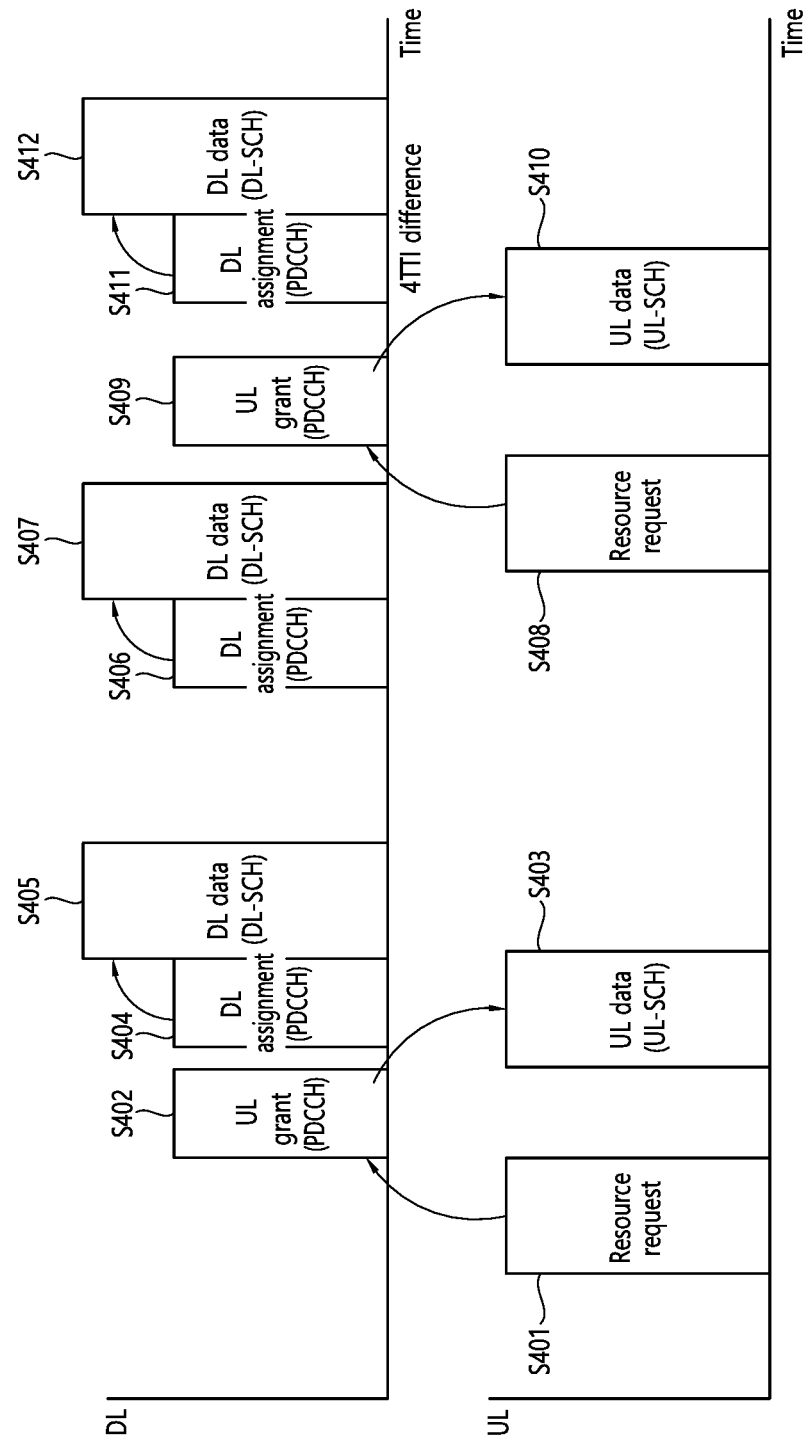
FIG. 4 is a drawing for explaining a method of dynamically assigning a radio resource.
Figure 5:
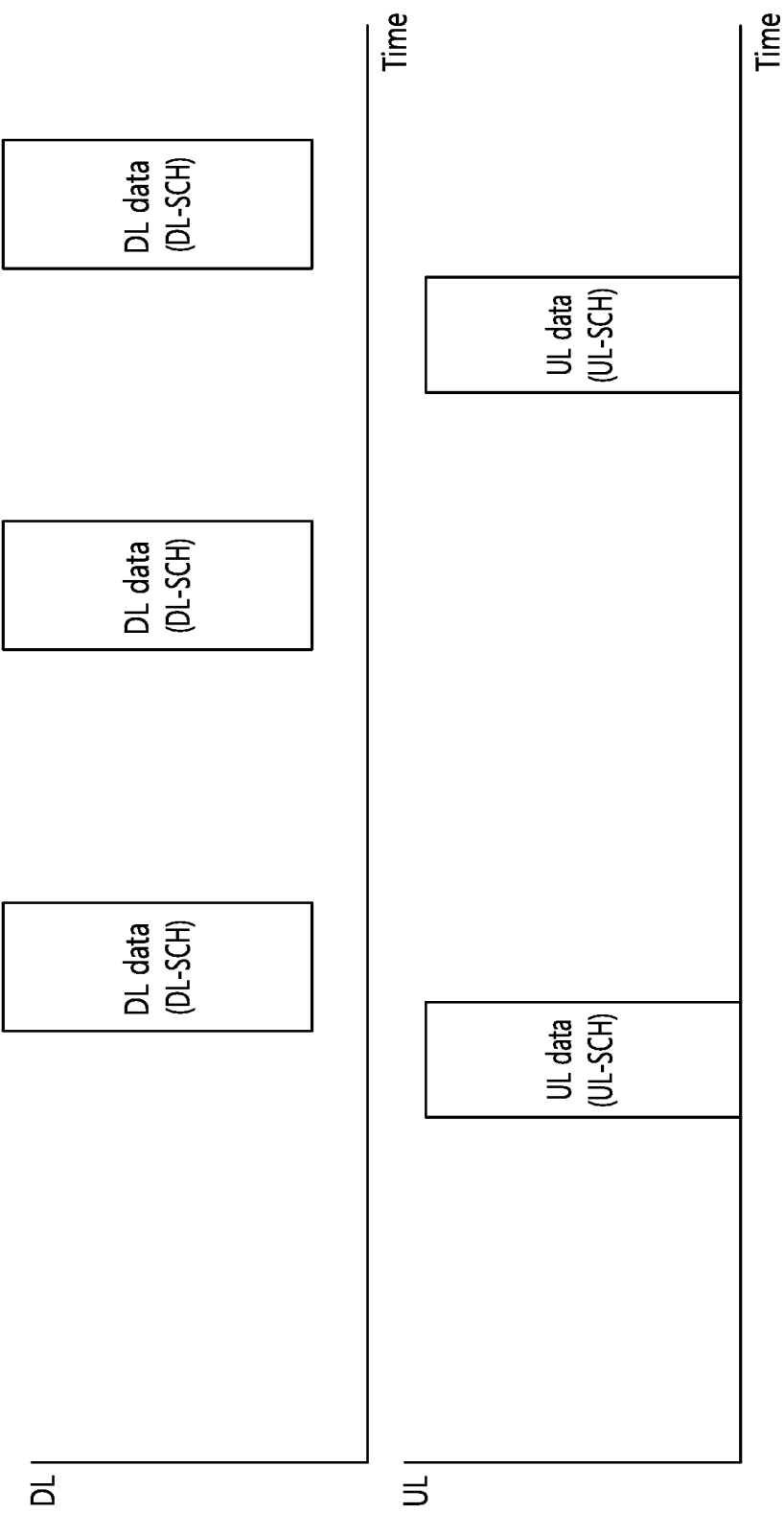
FIG. 5 is a drawing for explaining an SPS method.

FIG. 4 is a drawing for explaining a method of dynamically assigning a radio resource. FIG. 5 is a drawing for explaining an SPS method.

A typical process of transmitting data from a UE to an eNB (a method of dynamically assigning a radio resource) is described below with reference to FIG. 4. First, the UE may request the eNB to provide a radio resource required for transmission of generated data (S401). Therefore, the eNB may assign the radio resource through a control signal according to a radio resource request of the UE (S402). In an LTE system, the resource assignment of the eNB for transmitting UL data of the UE may be transmitted through a UL grant transmitted through a PDCCH. Therefore, the UE may transmit data to the eNB through the assigned radio resource (S403). The radio resource request of the UE, the resource assignment of the eNB, and corresponding UL data transmission of the UE may be optionally repeated (S408 to S410).

Meanwhile, when the eNB transmits downlink (DL) data to the UE, a DL assignment message may be transmitted to the UE through the PDCCH to know through which radio resource the data transmitted to the UE is transmitted (S404), and the eNB may transmit data to the UE through a radio resource corresponding to the DL assignment message (S405). In this case, DL assignment information transmission and DL data transmission through a radio resource corresponding thereto may be achieved in the same transmission time interval (TTI). Further, as shown in FIG. 4, the DL data transmission procedure may be repeated.

A method of assigning an SPS radio resource is a method in which first and second steps are skipped in three steps for transmitting data to the eNB (i.e., (1) the resource request of the UE, (2) the resource assignment of the eNB, and (3) the data transmission of the UE according to the resource assignment). Accordingly, the UE may perform a process of transmitting data directly without the aforementioned first and second steps, i.e., the step of requesting the radio resource and the step of assigning the radio resource, on the basis of a configuration of the radio resource. The concept of the SPS method is shown in FIG. 5. That is, in the SPS method, the eNB does not have to transmit radio resource assignment information all the time through the PDCCH.

Hereinafter, a Buffer Status Report (BSR) will be described.

A BSR corresponds to information being fed-back to the base station by a user equipment (UE) considering (or based on) a transport data size of the UE. Table 1 shown below represents an example for setting up (or configuring) a buffer size level according to the BSR.

TABLE 1

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |

TABLE 1-continued

| Index | Buffer Size (BS) value [bytes] |
|---|---|
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

Referring to Table 1, the UE divides (or splits) an uplink data size to 64 levels and transmits information on the uplink data size by using a 6-bit BSR. For example, in case the size of the uplink data that is to be transmitted by the UE is equal to 350 bytes, the UE transmits index value 24 by using a 6-bit BSR.

In case of an uplink, the base station configures a memory of a soft buffer based on the BSR information, which is received from the UE. More specifically, since a soft buffer size per UE corresponds to a region where the soft buffer value is stored prior to a channel decoding process, the base station must know the BSR information.

If the base station does not know the BSR information, the base station shall configure (or set up) the size of the soft buffer by assuming a size of the uplink data as the largest data size. However, in case of configuring the soft buffer size by assuming the largest data size, this method is disadvantageous in that it may cause a waste in memory of the base station.

Similarly, in case the base station configures the soft buffer by assuming a random data size, since the base station does not know the size of the data that is to be transmitted from the UE, eventually, this may lead to a problem in that data cannot be written in the soft buffer (i.e., in case the uplink data is larger than the size of the soft buffer). As a result, in case the base station randomly configures the soft buffer, the base station may be capable of performing channel decoding. However, this method is disadvantageous in that loss in uplink data may occur.

Additionally, a 5G New RAT (NR) communication system provides multiple numerology and multiple bandwidth. In a frequency of 6 GHz or less, a minimum bandwidth of 5 MHz may be supported, and, in a frequency of 6 GHz or higher, a maximum bandwidth of 400 MHz may be supported. A subcarrier width may be supported starting from 15 kHz to 30, 60, and 120 kHz, time units for scheduling include subframes, slots, and mini-slots. Since the length of the subframes, slots, and mini-slots is defined as the number of OFDM symbols, if the subcarrier width increases the actual scheduling time unit that is applied decreases.

The bandwidth, subcarrier width, scheduling unit, and so on, act as the main parameters for determining a maximum transport block (TB) within a single carrier in an NR communication system. Therefore, a maximum TB size that can be transmitted by a UE or base station (BS) in each carrier of the NR communication system may also be assigned with diverse values. If the maximum TB size is large, it is also preferable to increase the size of the soft buffer, which stores the TB. Therefore, soft buffer sizes that are adequate (or appropriate) for each carrier may also be assigned with diverse values.

Additionally, a partial bandwidth may be adopted in the 5G NR communication system. Also, different numerologies may be adopted to a single carrier in the 5G NR communication system. The different numerologies may be positioned according to an FDM scheme or may be positioned according to a TDM scheme. Herein, although partial bands having different numerologies are processed as the same cell, since the numerologies are different from one another, a partial band reserves a separate retransmission process. Therefore, a UE receiving a signal from different partial bands shall configure a soft buffer size in order to be capable of processing a retransmission process of each partial band.

Additionally, in the 5G NR communication system, the buffer needs to be unevenly (or unequally) split (or divided). A case where a soft buffer size enabling the UE to receive a transmission rate of X Gbps is equal to Z will be assumed. In case the UE receives a signal from 2 carriers, if the buffer is equally (or evenly) split (i.e., equal buffer splitting), the soft buffer size being applied to each carrier is equal to Z/2, and, accordingly, the maximum TB size that can be received from each carrier is reduced to ½. Therefore, the maximum transmission rate that can be received in each carrier is also equal to X/2 Gbps.

In LTE, the maximum bandwidth of a single carrier was merely 20 MHz. However, in NR, since the maximum bandwidth increases to a maximum of 400 MHz, problems caused by equally dividing (or splitting) the buffer may increase even more. A case where the bandwidth of Carrier 1, through which the UE receives a signal, is equal to 20 MHz and the bandwidth of Carrier 2, through which the UE receives a signal, is equal to 400 MHz will be assumed. In this case, if the UE equally splits the buffer and equally allocates the split buffer to Carrier 1 and Carrier 2, even if there is a large difference in bandwidth between Carrier 1 and Carrier 2, the signal shall be received at the same transmission rate. However, due to a lack of frequency resource in Carrier 1, it may be difficult to receive the signal as much as the required transmission rate in Carrier 1.

In this specification, the terms mini-slot, slot, and subframe are used as terms for expressing transmission units. In the present invention, each term can be interchangeably replaced with other terms. For example, the term enhanced Mobile BroadBand (eMBB)-specific subframe that is used in the exemplary embodiment, which will be described below, may be replaced with the term eMBB-specific slot.

The content of the present invention may also be applied to other exemplary embodiments applying the same concept as the exemplary embodiment of this specification.

The carrier (band) of this specification may correspond to different carriers (or different bands) within the NR, and the carrier (band) of this specification may also correspond to different carries within the NR and LTE. More specifically, the present invention may be applied to CA or DC within the NR, or the present invention may also be applied to CA or DC between the NR and LTE.

In the present invention, each of the proposed techniques may be separately or collectively applied. For example, Proposed Technique 1 may be applied along with subsidiary embodiments of Proposed Technique 1. As another example, Proposed Technique 1 may be applied along with Proposed Technique 4.

A maximum size of a transmittable TB may vary as described below based on a subcarrier width and a bandwidth. Firstly, it will be given that, in case a subcarrier width of 15 kHz is applied to 20 kHz and scheduling is configured in subframe units having 14 OFDM symbols, a maximum size of a transmittable TB is equal to $TB_{max}$. In this case, the $TB_{max}$ according to the subcarrier width and the bandwidth varies as described below.

In case both the bandwidth and the subcarrier width are increased linearly, the $TB_{max}$ is constantly maintained. For example, if the bandwidth is increased to 80 MHz whereas the subcarrier width is increased to 60 MHz, since the number of subcarriers within the bandwidth is constantly maintained, the size of the $TB_{max}$ is constant.

If the bandwidth is constant, and if only the subcarrier width increases, since the number of subcarriers within the carrier decreases, the size of the $TB_{max}$ decreases. For example, although the bandwidth is constantly 20 MHz, if the subcarrier width is increased to 60 MHz, the size of the $TB_{max}$ is decreased to ¼. As another example, although the bandwidth is increased to 40 MHz, if the subcarrier width is increased to 60 MHz, the size of the $TB_{max}$ is decreased to ½.

If the bandwidth increases whereas the carrier width is constant, since the number of subcarriers within the bandwidth increases, the size of the $TB_{max}$ is increased. According to the same principle, if the increased size of the bandwidth is greater than the increased size of the subcarrier width, the $TB_{max}$ is increased. For example, if the bandwidth increases to 80 MHz whereas the subcarrier width is constantly 15 MHz, the size of the $TB_{max}$ is increased to 4 times. As another example, if the bandwidth increases to 160 MHz and the subcarrier width increases to 60 kHz, the size of the $TB_{max}$ is increased to 2 times.

In a 5G NR communication system, cases such as the above-described exemplary embodiment may occur. For example, in order to satisfy the low latency condition of Ultra-Reliable and Low Latency Communications (URLLC) in a carrier of 6 GHz or below, a subcarrier width of 60 kHz may be applied. As another example, in order to ensure coverage in a carrier of 6 GHz or below, a subcarrier width of 15 kHz or 30 kHz having a long CP length may be applied. In this case, an FFT size that is used when performing OFDM symbol modulation may be increased to 4096. Additionally, in a same carrier, the subcarrier width of Partial Band 1 may be set to 15 kHz, and the subcarrier width of Partial Band 2 may be set to 60 kHz.

In a 5G communication system, scheduling may be performed in subframe units as well as slot or mini-slot units having shorter time durations than subframe. The change in the $TB_{max}$ size according to the scheduling time unit is as described below.

Generally, a subframe is configured of 14 OFDM symbols, and a slot is configured of 7 OFDM symbols. Since the number of symbols in a slot is ½, in case scheduling is performed in slot units, the size of the $TB_{max}$ becomes ½.

The mini-slot has a smaller number of OFDM symbols than the slot. For example, in case the number of OFDM symbols within a mini-slot is equal to 1, the size of the $TB_{max}$ becomes ¼.

According to the soft buffer size being allocated to each carrier or partial band, the size of the $TB_{max}$ that can be used in each carrier or partial band may be limited, or a modulation scheme and coding rate (e.g., MCS level) being applied when transmitting a TB may be limited. More specifically, limited buffer rate matching (LBRM) may be applied in the base station based on the soft buffer size per partial band of the UE. If the LBRM is applied, coding gain occurs. And, as the soft buffer size becomes smaller, the decrease in coding gain increases.

Based on the above-described observation results, the present invention proposes a method of efficiently splitting, by a UE being connected to multiple partial bands or carriers, the soft buffer to each carrier and partial band. In the following exemplary embodiment, it will be given that the size of a soft buffer belonging to the UE is equal to $N_{soft}$, and that the UE is connected to $N_C$ number of carriers, and that a partial band of an $n_c^{th}$ carrier corresponds to $N_p$. Herein, each of $N_{soft}$, $N_C$, and $N_p$ is an integer greater than 1. In a specific carrier, if $N_p=1$, this indicates that the carrier is not split (or divided) to partial bands.

The details proposed in this specification are as described below.

<Proposed Technique 1>

The UE divides (or splits) the soft buffer in proportion to the number of subcarriers in each partial band. As a first example, $N_{soft}$ may be allocated in proportion to the number of subcarriers $SC_n$ of each partial band. Herein, N=1, 2, ..., $N_C*N_p$. As a second example, $N_{soft}$ may be split and allocated in proportion to the number of resource blocks $RB_n$ of each partial band. Herein, N=1, 2, ..., $N_C*N_p$. In another example, it is given that the bandwidth of an $n^{th}$ partial band is equal to $BW_n$ and that the subcarrier width is equal to $SCS_n$. Herein, N=1, 2, ..., $N_C*N_p$. $N_{soft}$ may be allocated in proportion to $BW_n/SCS_n$. As a third example, when the bandwidth of an $n^{th}$ partial band is equal to $BW_n$, and when an RF bandwidth that can be received, by the UE, from the corresponding partial band is $RFBW_n$, $N_{soft}$ may be allocated in proportion to $RFBW_n/SCS_n$. Herein, N=1, 2, ..., $N_C*N_p$.

In order to perform the above-described operations, the UE explicitly or implicitly receives a number of subcarriers in each partial band from the base station. For this, when the base station transmits a higher layer signal to the UE, a value of the signal is generated based on a number of subcarriers in a carrier or partial band being connected to each UE or based on a value that is proportional to the number of subcarriers. Since the base station knows the carrier and partial band being connected to the UE and their characteristics, TB size selection, code block segmentation, LBRM, and so on, are performed based on the soft buffer size of each carrier or partial band of the UE.

As described in the observation results presented above, when the subcarrier width is constant, if the bandwidth increases, the $TB_{max}$ also increases, and, when the bandwidth is constant, if the subcarrier width increases, the $TB_{max}$ decreases. Therefore, it will be preferable to split (or divide) the soft buffer in proportion to the bandwidth and in inverse-proportion to the subcarrier band. Additionally, a sum (or combination) of the partial bands may be greater than the bandwidth of a carrier through which partial bands are transmitted. For example, when a carrier has 2 partial bands each having a bandwidth of $BW_1$ and $BW_2$, and when the partial bands are processed with FDM, the sum of the partial band bandwidth may be greater than the bandwidth of the carrier $BW_c$. More specifically, $BW_c \leq BW_1+BW_2$. As another example, when the carrier has 2 partial bands and the number of subcarriers in each partial band is respectively equal to $SC_1$ and $SC_2$, and when the number of subcarriers of the corresponding carrier is equal to $SC_c$, $SC_c \leq SC_1+SC_2$. This is because the band of the partial bands may overlap one another. Typically, Partial Band 1 may correspond to a partial band dedicated to eMBB services using only part of the entire band, and Partial Band 2 may correspond to a partial band dedicated to URLLC, which may use the entire band. Therefore, in Proposed Technique 1, instead of allocating the soft buffer to each carrier and then allocating the soft buffer to the partial bands within each carrier, the soft buffer is allocated based on the partial bands.

The bandwidth that is used in the third example of Proposed Technique 1 may correspond to a bandwidth including a guard band or may correspond to a bandwidth not including a guard band. Generally, since communication is not performed in a guard band, it will be preferable to set up $BW_n$ as a bandwidth excluding a guard band. In a first example, since each subcarrier or a number of subcarriers in each partial band is used, the guard band is already excluded. More specifically, a buffer size being allocated to an $n^{th}$ carrier or partial band may be as described below.

In a first example, a buffer size being allocated to an $n^{th}$ carrier or partial band may be indicated as shown below.

$$Buffer_n = \alpha N_{Soft} \frac{SC_n}{\sum_{n=1}^{N_C+N_P} SC_n} \qquad \text{[Equation 1]}$$

In a second example, a buffer size being allocated to an $n^{th}$ carrier or partial band may be indicated as shown below.

$$Buffer_n = \alpha N_{Soft} \frac{RB_n}{\sum_{n=1}^{N_C+N_P} RB_n} \qquad \text{[Equation 2]}$$

In a third example, a buffer size being allocated to an $n^{th}$ carrier or partial band may be indicated as shown below.

$$Buffer_n = \alpha N_{Soft} \frac{BW_n/SCS_n}{\sum_{n=1}^{N_C+N_P} BW_n/SCS_n} \qquad \text{[Equation 3]}$$

Herein, $\alpha$ represents a value being determined by another factor, and N=1, 2, ..., $N_C+N_p$.

As another example, the UE may split (or divide) the soft buffer in proportion to an aggregation (or combination) of multiple partial bands. For example, when it is assumed that Partial Bands 1, 2, 3, 4, and 5 are included in a specific carrier being is connected to the UE, a new Partial Band #A may be configured by aggregating (or combining) Partial Bands 1 and 2, and another Partial Band #B may be configured by aggregating 3, 4, and 5. Accordingly, the UE may distribute the soft buffer in proportion to the size of Partial Band #A and Partial Band #B.

<Proposed Technique 1.1>

Along with Proposed Technique 1 or separately, the size of the soft buffer being distributed to each partial band by the UE may vary in proportion to the number of OFDM symbols for performing scheduling. Herein, it will be given that the number of OFDM symbols being included in a unit performing scheduling in an $n^{th}$ carrier or partial band is equal to $OFSym_n$. The size of the soft buffer may be distributed to each carrier or partial band in proportion to $OFSym_n$.

In order to perform the above-described operation, the base station explicitly or implicitly notifies the scheduling unit to the UE via higher layer signal. Additionally, the base station performs TB size selection, code block segmentation, LBRM, and so on, based on the soft buffer size of each carrier or partial band of the UE.

As in the above-described observation results, if the subcarrier width and bandwidth are constant, if the number of OFDM symbols of the scheduling unit varies, the $TB_{max}$ also varies. The soft buffer size of a case where Proposed Technique 1.1 is applied may be distributed as described below.

In a first example of the Proposed Technique 1, a soft buffer size may be indicated as shown below.

$$Buffer_n = \alpha N_{Soft} \frac{SC_n OFSym_n}{\sum_{n=1}^{N_C+N_P} SC_n OFSym_n} \qquad [\text{Equation 4}]$$

In a second example of the Proposed Technique 1, a soft buffer size may be indicated as shown below.

$$Buffer_n = \alpha N_{Soft} \frac{RB_n OFSym_n}{\sum_{n=1}^{N_C+N_P} RB_n OFSym_n} \qquad [\text{Equation 5}]$$

In a third example of the Proposed Technique 1, a soft buffer size may be indicated as shown below.

$$Buffer_n = \alpha N_{Soft} \frac{BW_n OFSym_n / SCS_n}{\sum_{n=1}^{N_C+N_P} BW_n OFSym_n / SCSn} \qquad [\text{Equation 6}]$$

Herein, $\alpha$ represents a value being determined by another factor, and $N=1, 2, \ldots, N_C+N_P$.

<Proposed Technique 1.2>

Along with Proposed Technique 1 and/or Proposed Technique 1.1 or separately, the soft buffer is allocated in proportion to a number of Hybrid Automatic Repeat request (HARQ) processes being applied to each partial band. For example, when the number of HARQ processes of Partial Band 1 is equal to 4 and the number of HARQ processes of Partial Band 2 is equal to 8, and when other parameters are the same, Partial Band 2 is allocated with a soft buffer having a size that is 2 times larger than that of Partial Band 1.

In order to perform the above-described operations, the base station explicitly or implicitly notifies the number of HARQ processes to the UE via UE-specific signal. Additionally, the base station performs TB size selection, code block segmentation, LBRM, and so on, based on the soft buffer size of each carrier or partial band of the UE.

In NR, in case each partial band has a different numerology and supports different services, each partial band may have a different number of HARQ processes. If the number of processes increases, the required soft buffer size increases accordingly. Therefore, the soft buffer size may be configured (or set) in proportion to the number of HARQ processes.

<Proposed Technique 1.3>

The proposed technique applies soft buffer splitting while considering a maximum modulation scheme of each carrier or partial band. For example, in case the maximum modulation scheme of Carrier 1 is 1024QAM and the maximum modulation scheme of Carrier 2 is 256QAM, a maximum of 10-bit information may be transmitted from 1 RE in Carrier 1, and a maximum of 8-bit information may be transmitted from 1 RE in Carrier 2. Therefore, under the same condition, among the entire soft buffer, $10/18$ of the buffer is allocated to Carrier 1, and $8/18$ of the buffer is allocated to Carrier 2.

<Proposed Technique 1.4>

Along with Proposed Technique 1 and/or Proposed Technique 1.1 and/or Proposed Technique 1.2 or separately, the soft buffer size may be varied based on a minimum coding rate or maximum coding rate or a reference coding rate being applied to each carrier or partial band. For example, it will be given that a minimum coding rate that can be used in the $n^{th}$ partial band is equal to $r_n$. At this point, the soft buffer size may be distributed to each partial band in inverse-proportion to $r_n$. As another example, in addition to the minimum coding rate, $r_n$ may also correspond to a maximum coding rate or a reference coding rate.

In order to perform the above-described operations, the base station explicitly or implicitly notifies the minimum coding rate or maximum coding rate or reference coding rate to the UE via UE-specific signal. As an example of the implicit notification, when there are 2 base graphs of LDPC, and when the minimum coding rates of each base graph are different from one another, the base station may implicitly notify the minimum coding rate by indicating the base graph that is used by the base station for channel encoding. Additionally, the base station performs TB size selection, code block segmentation, LBRM, and so on, based on the soft buffer size of each carrier or partial band of the UE.

In the NR, a minimum coding rate or a maximum coding rate or a reference coding rate being applied to a physical layer may vary based on the service that is provided to the UE. For example, although up to a $1/12$ coding rate is supported in URLLC, only up to a $1/3$ coding rate is supported in eMBB. In this case, even if the same TB is transmitted, the URLLC requires a buffer size that is 4 times larger than that of the eMBB. Therefore, the soft buffer size may vary in inverse-proportion to the minimum coding rate being applied to each carrier or partial band. As another example, although a maximum coding rate of $3/4$ coding rate is supported in URLLC, only up to an $8/9$ coding rate is supported in eMBB. Since a case of gaining the maximum coding rate corresponds to a case of applying the highest coding rate, the soft buffer may be distributed based on the maximum coding rate of each carrier or partial band. As another example, the coding rate that is most frequently used in URLLC may be $1/2$, and the coding rate that is most frequently used in eMBB may be $2/3$. In this case, the soft buffer size may be distributed based on the most frequently used coding rate.

<Proposed Technique 2>

The UE divides (or splits) the soft buffer in proportion to the number of subcarriers in each subcarrier being connected to the UE (or UE-specific carrier). Thereafter, the UE splits the soft buffer per partial band within the soft buffer. Herein, the process of splitting (or dividing) the soft buffer per partial band may be semi-statically or dynamically processed. Herein, a time gap between a change in the soft buffer size of each carrier may differ from a time gap between a change in the soft buffer size of each partial band. As an example of the above-described technique, $N_{soft}$ may be allocated per partial band in proportion to the number of subcarriers of each carrier $SC_n$, wherein n=1, 2, . . . , $N_C$. Thereafter, the allocated $N_{soft}$ is allocated per partial band. As another example, it will be given that the bandwidth of an $n^{th}$ carrier is equal to $BW_n$, wherein n=1, 2, $N_C$ and that the subcarrier width is equal to $SCS_n$. Herein, $N_{soft}$ may be allocated per carrier in proportion to $BW_n/SCS_n$, and, then, the allocated $N_{soft}$ is allocated per partial band. As another example, when the bandwidth of an $n^{th}$ carrier (UE-specific carrier) is equal to $BW_n$, and when an RF bandwidth that can be received, by the UE, from the corresponding carrier (UE-specific carrier) is $RFBW_n$, $N_{soft}$ may be allocated in proportion to $RFBW_n/SCS_n$.

In order to perform the above-described operations, the UE explicitly or implicitly receives a number of subcarriers in each carrier from the base station. For this, when the base station transmits a higher layer signal to the UE, a value of the signal is generated based on a number of subcarriers in a carrier or partial band being connected to each UE or based on a value that is proportional to the number of subcarriers. Since the base station knows the carrier and partial band being connected to the UE and their characteristics, TB size selection, code block segmentation, LBRM, and so on, are performed based on the soft buffer size of each carrier or partial band of the UE.

Although the bandwidth and number of subcarriers in each carrier are values that hardly change (or vary), the bandwidth and number of subcarriers in each partial band may semi-statically or dynamically vary (or change). Unlike the Proposed Technique 1, this technique corresponds to a method of firstly allocating the soft buffer per carrier and then allocating the soft buffer per partial band when needed. Therefore, as compared to Proposed Technique 1, this method is more adequate (or appropriate) for being applied to a case where the soft buffer is semi-statically allocated per carrier and where the soft buffer is semi-statically allocated according to a shorter cycle period or dynamically allocated per partial band. However, in case the partial band of each carrier is allocated with a specific overlapping subcarrier, it will be disadvantageous in that the soft buffer is not allocated in proportion to the number of subcarriers in each partial band.

<Proposed Technique 2.1>

In addition to the Proposed Technique 2 for splitting each carrier to the soft buffer, allocation may be performed based on the number of OFDM symbols used for performing scheduling of each carrier and/or the number of HARQ processes and/or the maximum modulation scheme and/or a minimum/maximum/reference coding rate of a mother code.

Although Proposed Technique 1.1 to Proposed Technique 1.4 are described based on a case where the soft buffer is allocated per carrier, the proposed techniques may also be applied to a case where the soft buffer is allocated per carrier. For example, in case of splitting the soft buffer by using the number of subcarriers in each carrier, the number of OFDM symbols for performing scheduling, and the number of HARQ processes, the soft buffer size per carrier is as described below.

$$Buffer_n = \alpha N_{Soft} \frac{SC_n OFSym_n M_n}{\sum_{n=1}^{N_C+N_P} SC_n OFSym_n M_n} \quad \text{[Equation 7]}$$

Herein, in $SC_n$, n=1, 2, $N_C$, and $M_n$ represents a number of HARQ processes. When performing the above-described operations, although one carrier has 2 partial bands, in case the number of HARQ processes and the scheduling units of each partial band are different from one another, a method for calculating such values is needed. In case such values are not applied, when splitting soft buffer per carrier, a method of allocating the soft buffer only based on the number of subcarriers, and, afterwards, allocating the soft buffer per partial band based on the number of OFDM symbols, the number of HARQ processes, and so on, may be used. Alternatively, for the above-described reasons, Proposed Technique 1 may be applied. Alternatively, a specific rule may be selected and applied. The corresponding method is as described below.

<Proposed Technique 2.1.1>

A method for determining a number of HARQ processes of a carrier having multiple partial bands and a number of OFDM symbols for performing scheduling includes the following options.

Opt 1) A partial band being allocated with the largest band within the carrier is defined as a main partial band, and the number of OFDM symbols for performing scheduling of the corresponding band and the number of HARQ processes are used in the carrier. In this case, the number of carriers may be calculated based on the carrier band.

Opt 2) A partial band having the greatest $SC_n OFSym_n M_n$ value within the carrier is defined as a main partial band, and the number of OFDM symbols for performing scheduling of the corresponding band and the number of HARQ processes are used in the carrier. In this case, the number of carriers may be calculated based on the carrier band.

Opt 3) The partial bands within the carrier are multiplied by a weighting factor.

Opt 4) In case partial bands are split to eMBB and URLLC, when performing scheduling of eMBB, the number of OFDM symbols and the number of HARQ processes are applied.

Opt 5) Soft buffer splitting is performed in partial band units as described in Proposed Technique 1.

<Proposed Technique 2.2>

When splitting the soft buffer, which is split to each carrier, to each partial band, the soft buffer may be allocated in proportion to a number of subcarriers in each partial band. As an example of the above-described technique, $Buffer_n$ may be allocated per carrier in proportion to the number of subcarriers of each partial band $SC_m$, wherein m=1, 2, . . . , $N_P$. Thereafter, the allocated $N_{soft}$ is allocated per partial band. As another example, $Buffer_n$ may be allocated per carrier in proportion to a number of resource blocks of each carrier $RB_m$, wherein m=1, 2, . . . , $N_P$. Thereafter, $Buffer_n$ is allocated per partial band in proportion to the number of RBs in each partial band. As another example, it will be given that the bandwidth of an $n^{th}$ carrier is equal to, wherein n=1, 2, . . . , $N_P$, and that the subcarrier width is equal to $SCS_n$. Herein, $N_{soft}$ is allocated per carrier in proportion to $BW_n/SCS_n$, and, then, $N_{soft}$ is allocated in proportion to the partial band.

In order to perform the above-described operations, the UE explicitly or implicitly receives a number of subcarriers in each partial band from the base station. For this, when the base station transmits a higher layer signal to the UE, a value of the signal is generated based on a number of subcarriers in a carrier or partial band being connected to each UE or based on a value that is proportional to the number of subcarriers. Since the base station knows the carrier and partial band being connected to the UE and their characteristics, TB size selection, code block segmentation, LBRM, and so on, are performed based on the soft buffer size of each carrier or partial band of the UE.

Proposed Technique 1.1 to Proposed Technique 1.4 may also be applied to the above-described operation as described below.

<Proposed Technique 2.2.1>

In addition to the Proposed Technique 2 for splitting each partial band to the soft buffer, allocation may be performed based on the number of OFDM symbols used for performing scheduling of each carrier and/or the number of HARQ processes and/or the maximum modulation scheme and/or a minimum/maximum/reference coding rate of a mother code.

For example, in case of splitting the soft buffer by using the number of subcarriers in each carrier, the number of OFDM symbols for performing scheduling, and the number of HARQ processes, the soft buffer size per partial band is as described below.

$$Buffer_{n,m} = \alpha Buffer_n \frac{SC_n OFSym_n M_n}{\sum_{n=1}^{N_C+N_P} SC_n OFSym_n M_n} \quad \text{[Equation 8]}$$

Herein, in $SC_n$, n=1, 2, . . . , $N_C$, and $M_n$ represents a number of HARQ processes. When performing the above-described operations, the method of splitting the soft buffer per carrier will not be limited to only one specific method.

<Proposed Technique 2.3>

Thereafter, in case a priority of a specific partial band within a specific carrier is high, the base station indicates a soft buffer size that shall be reserved for the corresponding partial band to the UE via higher layer signaling. For example, it will be assumed that a specific carrier is divided (or split) to 2 partial bands, and that Partial Band 1 corresponds to a partial band dedicated to URLLC and Partial Band 2 corresponds to a partial band dedicated to eMBB. Since URLLC requires high reliability, it will be preferable not to apply limited rate matching. Therefore, the UE reserves a soft buffer size that is required for the URLLC by using the $TB_{max}$ of a URLLC-dedicated partial band, a number of HARQ processes, a number of layers, and so on, and uses the remaining soft buffer size for eMBB. Alternatively, the base station may notify the soft buffer size that is to be reserved for URLLC to the UE via higher layer signal. Additionally, the base station performs TB size selection, code block segmentation, LBRM, and so on, based on the soft buffer size of each carrier or partial band of the UE.

In the above-described exemplary embodiment, it is assumed that a soft buffer size being allocated to a specific carrier is equal to $N_{soft,n}$ and that the corresponding carrier is divided (or split) to Partial Bands 1 and 2. In this case, since Partial Band 1 has a higher priority than Partial Band 2, the UE may reserve a buffer size corresponding to $N_{partial, 1}$ for Partial Band 1 and may perform limited rate matching for Partial Band 2 in the remaining buffer size corresponding to $N_{soft,n}-N_{partial, 1}$.

<Proposed Technique 3>

The soft buffer size is distributed based on a maximum number of CBs that can be transmitted from a single TB in each partial band being connected to the UE. For example, the maximum number of CBs may be calculated by dividing $TB_{max}$ by a maximum length of the CB (e.g. 8192) so as to obtain the $CB_n$ of each carrier or partial band, and, then, $N_{soft}$ may be divided and allocated in proportion to the calculated value. Herein, n=1, 2, . . . , $N_C*N_p$. And, the base station performs TB size selection, code block segmentation, LBRM, and so on, based on the soft buffer size of each carrier or partial band of the UE.

When the TB is divided to multiple CBs, the TB is generally divided based on the CB having the greatest length. This is because the channel coding performance (or capability) is generally greater as the length of a codeblock becomes longer. Therefore, if the soft buffer is divided (or split) based on the maximum number of CBs that can be transmitted by each UE when the TB size is equal to $TB_{max}$, the soft buffer may be distributed to each carrier and partial band based on $TB_{max}$.

In case the soft buffer is divided (or split) based on the CB, a problem may occur if the maximum CB sizes of each carrier or partial band are different from one another. For example, since the packet size of URLLC is expected to be smaller than that of eMBB, the maximum CB of URLLC may be smaller than the maximum CB of eMBB. In this case, even though the TBs have the same size, the maximum number of CB included in the corresponding TBs may be different from one another. More specifically, since the URLLC may have a larger number of CBs than the eMBB, the URLLC may be allocated with a larger soft buffer size.

<Proposed Technique 4>

A case where the UE is simultaneously connected to LTE and NR will be assumed. In this case, the UE may calculate the soft buffer as described below, and the base station may perform LBRM according to the following rule.

Opt 1) In case the bandwidth of the NR is equal to or greater than 20 MHz, the bandwidth of the NR may be divided by 20 MHz so as to deduce a number of virtual cells, and, then, a number of configured serving cells is calculated based on the deduced number of virtual cells. For example, in case the UE is connected to an NR carrier and LTE carrier of 100 MHz, the number of configured serving cells of the UE is equal to 6, and ⅙ of the soft buffer is allocated for the LTE.

Opt 2) The UE randomly configures an LTE UE category based on the soft buffer size, and, then, notifies the configured LTE UE category to the base station.

Opt 3) The UE may view an LTE carrier to be the same as an NR carrier and may perform soft buffer splitting accordingly. An NR base station notifies a soft buffer size being allocated to LTE by the UE to an LTE base station. Alternatively, the UE directly notifies the corresponding soft buffer size to the LTE base station. Herein, the NR base station may correspond to a master base station (or primary cell) or a secondary base station (or secondary cell).

Opt 4) The master base station determines an allocation ratio of a UE soft buffer and notifies the determined allocation ratio to a secondary base station configured to the UE. The master base station may transfer (or deliver) the corresponding ratio information to the UE via UE-specific signal, and the UE performs LBRM by allocating the soft buffer according to the determined ratio. Herein, the master base station may correspond to an LTE base station or an NR base station.

In LTE, it is assumed that the bandwidth of a carrier being connected to the UE is equal to 20 MHz, and soft buffer splitting is performed accordingly. However, in the NR, the UE may be allocated with a band of 20 MHz or higher in a single carrier. Therefore, a soft buffer splitting method considering a case where the UE is connected to both NR and LTE is needed.

Opt 1 corresponds to a method of permuting one NR cell having a large bandwidth to multiple LTE cells. For example, in case one NR carrier has a band of 150 MHz, the corresponding carrier may be permuted to 7 or 8 LTE serving cells, and, then, soft buffer splitting may be performed accordingly. More specifically, the buffer is allocated as much as $N_{soft}/8$ or $N_{soft}/9$ in LTE. In NR, the buffer is allocated as much as $7N_{soft}/8$ or $8N_{soft}/9$, and the exemplary embodiment of the above-described Proposed Techniques 1~3 may be applied to the corresponding soft buffer, thereby being capable of allocating the soft buffer.

Opt 2 corresponds to a method of randomly selecting, by a UE, an LTE UE category based on its soft buffer size and NR bandwidth and notifying the values to an LTE base station and an NR base station. The NR base station may acquire a soft buffer size that is to be used in NR, by the UE, by using the UE category that is reported to the LTE by the UE. More specifically, if the buffer size that is to be used in LTE by the UE is equal to $L_{soft}$, the buffer size that is to be used in NR by the UE is equal to $N'_{soft}=N_{soft}-L_{soft}$. The UE may allocate the soft buffer based on $N'_{soft}$ by applying the exemplary embodiments of Proposed Techniques 1~3.

Opt 3 corresponds to a method of allocating the soft buffer, by the UE, by applying the same rule to the LTE and the NR and, then, notifying the corresponding value. In Opt 3, in order to avoid configuring an interface between an additional UE and the base station, the NR base station may notify the soft buffer size to the LTE base station. For this, the NR base station shall be aware of the number of LTE base stations being connected to the UE (or the number of LTE base stations being configured to the UE).

Opt 4 corresponds to a method of determining, by a master base station (or cell), an allocation ratio of a UE soft buffer and, then, notifying the allocation ratio of the soft buffer to secondary base stations (or cells). Herein, the master base station may correspond to an LTE base station or an NR base station.

<Proposed Technique 5>

A carrier or partial band being configured to the UE (or UE-specific carrier or partial band) may be activated/deactivated. In this case, the soft buffer being allocated to each UE may be allocated as described below.

Opt 1) The soft buffer may be allocated to each carrier or partial band based on a carrier or partial band being configured to the UE.

Opt 2) The soft buffer may be allocated to each carrier or partial band based on a carrier or partial band being activated to the UE. In this case, even if the number of carriers or partial bands being configured to the UE is constant, the soft buffer size being allocated, by the UE, to each carrier or partial band may vary (or change) based on the activation/deactivation of the carrier or partial band, and the LBRM is then performed accordingly.

The proposed technique relates to a method for configuring a reference standard, by the UE, for allocating the soft buffer, and, herein, the above-described Proposed Techniques 1 to 4 and the subsidiary clauses may also be used when allocating the soft buffer.

Opt 1 is appropriate for a case where the UE is configured to different base stations and where each base station activates/deactivates the carrier or partial band for a specific UE. This is because, in case a base station fails to acknowledge the activation/deactivation of a neighboring (or adjacent) base station, the corresponding base station may determine a wrong soft buffer size that is allocated and transmit a signal accordingly.

Opt 2 is appropriate for a case where the UE is configured to one base station and where the carrier or partial band within the base station is activated/deactivated and for a case where the UE is configured to multiple base stations and activation/deactivation information is exchanged between the multiple base stations. Opt 2 is advantageous in that the soft buffer may be more efficiently used as compared to Opt 1. However, this is because the base stations being configured to the UE shall be capable of exchanging activation/deactivation information. Alternatively, this method may also be applied to a case where the UE transmits signaling that notifies, to all base stations being configured to the UE, the activated carriers or partial bands among the carriers or partial bands being configured to the UE. The signal may be transferred (or delivered) to the base stations via L2/L3 signal or RRC signal.

As an exemplary soft buffer splitting equation of this specification, this equation may be applied to an equation and table adopting the same principle.

Figure 6:
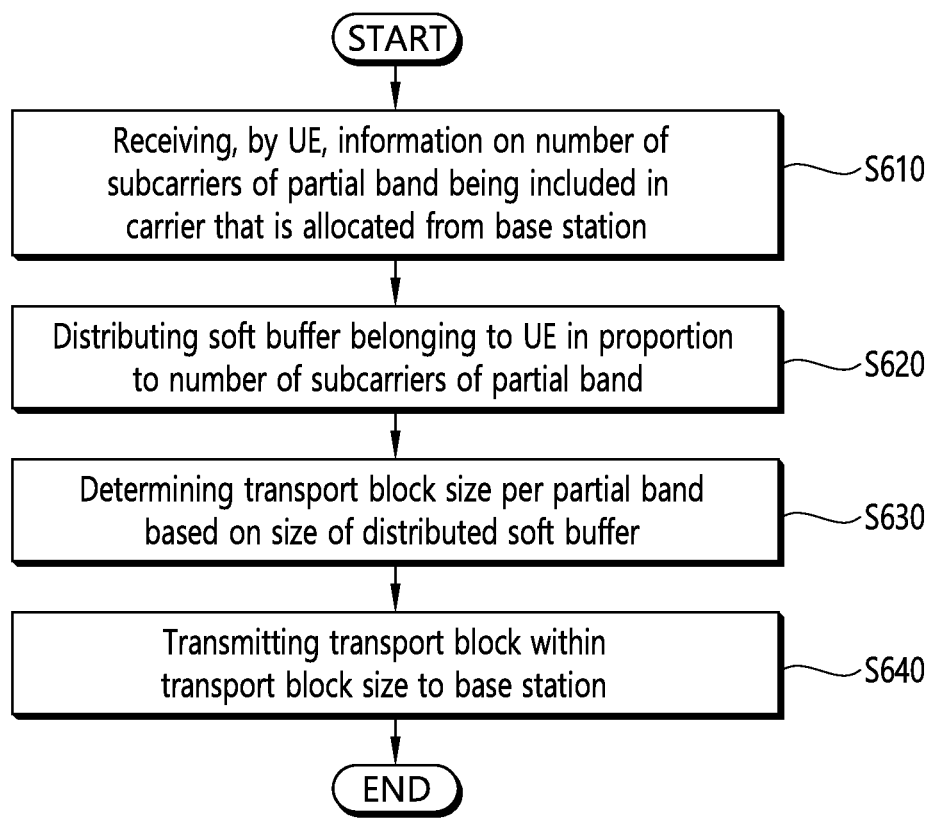
FIG. 6 is a diagram showing a procedure for transmitting a transport block according to an exemplary embodiment of this specification.

FIG. 6 is a diagram showing a procedure for transmitting a transport block according to an exemplary embodiment of this specification.

This exemplary embodiment proposes a method of efficiently splitting (or dividing), by a UE being connected to multiple partial bands or carriers, a soft buffer for carriers and partial bands. The UE may be allocated with at least one carrier, and the specific carrier may include at least one partial band. If the number of partial bands is equal to 1, it may be understood that the specific carrier is not split (or divided) to partial bands.

In step S610, the UE receives information on the number of subcarriers in a partial band being included in the allocated carrier from the base station. The number of subcarriers in the partial band may be explicitly or implicitly received from the base station via higher layer signaling.

In step S620, the UE may distribute a soft buffer included in the UE in proportion to the number of subcarriers of the partial band. For example, if the partial band includes a first partial band and a second partial band, the soft buffer may be distributed based on the number of subcarriers in the first partial band and the number of subcarriers in the second partial band.

In step S630, the UE determines a transport block size per partial band based on the distributed soft buffer size. The transport block size may correspond to a maximum transport block size that can be transmitted from the partial band.

In step S640, the UE transmits a transport block to the base station within the determined transport block size.

If the bandwidth of the partial band is constant whereas a gap between the subcarriers increases, the number of subcarriers of the partial band may be decreased. Accordingly, the soft buffer size being distributed to the partial band is decreased, and the transport block size being transmitted from the partial band may be decreased.

If the bandwidth of the partial band is increased whereas a gap between the subcarriers is constant, the number of subcarriers of the partial band may be increased. Accordingly, the soft buffer size being distributed to the partial band is increased, and the transport block size being transmitted from the partial band may be increased.

In case the partial band includes a first partial band and a second partial band, a sum (or combination) of a bandwidth of the first partial band and a bandwidth of the second partial band may be equal to or larger than the bandwidth of the carrier. In this case, the first partial band and the second partial band may be processed with Frequency Division Multiplexing (FDM).

In case the partial band includes a first partial band and a second partial band, a sum (or combination) of a number of subcarriers in the first partial band and a number of subcarriers in the second partial band may be equal to or larger than the number of subcarriers in the carrier. In this case, the first partial band and the second partial band may overlap one another. For example, the first partial band may support enhanced Mobile BroadBand (eMBB) services, and the second partial band may support Ultra-Reliable and Low Latency Communications (URLLC) services. More specifically, the first partial band may correspond to a partial band dedicated to eMBB services using only part of the entire band, and the second partial band may correspond to a partial band dedicated to URLLC, which may use the entire band. The entire band may correspond to the entire carrier band being allocated to the UE.

Additionally, the soft buffer belonging to the UE may be distributed in proportion to a number of Orthogonal Frequency Division Multiplexing (OFDM) symbols being scheduled in the partial band. More specifically, if a gap between the subcarriers and the bandwidth are constant, the soft buffer size or maximum transport block size may vary (or change) in proportion to the number of symbols, which corresponds to units for performing scheduling of the partial band. The number of OFDM symbols being scheduled in the partial band may be received via higher layer signal.

Additionally, the soft buffer belonging to the UE may be distributed in proportion to a number of Hybrid Automatic Repeat request (HARQ) processes of the partial band. The number of HARQ processes may be received via UE-specific signal.

Additionally, the soft buffer belonging to the UE may be distributed in proportion to a maximum number of information bits being supported by a maximum modulation scheme of the partial band. For example, in case the maximum modulation scheme of the first partial band is 1024QAM and the maximum modulation scheme of second partial band is 256QAM, a maximum of 10-bit information may be transmitted from 1 RE in the first partial band, and a maximum of 8-bit information may be transmitted from 1 RE in the second partial band. Therefore, under the same condition, among the entire soft buffer, $10/18$ of the buffer is allocated to the first partial band, and $8/18$ of the buffer is allocated to the second partial band.

Additionally, the soft buffer belonging to the UE may be distributed in inverse proportion to a minimum coding rate being applied to the partial band. The minimum coding rate may be received via UE-specific signal. Furthermore, the UE may distribute the soft buffer based on the minimum coding rate as well as the maximum coding rate or the reference coding rate.

In case multiple carrier are allocated from the base station, the soft buffer belonging to the UE may be distributed in proportion to the number of subcarriers of the carrier before the soft buffer is distributed in proportion to the number of subcarriers of the partial band. More specifically, after the UE distributes its soft buffer to each carrier, the UE may re-distribute the soft buffer per partial band.

The UE may be simultaneously connected to a first communication system and a second communication system. The first communication system may correspond to a 5G NR system, and the second communication system may correspond to an LTE system. Based on a number of cells being configured to the first communication system and a number of cells being configured to the second communication system, the soft buffer belonging to the UE may be distributed to each of the first communication system and the second communication system.

At this point, the number of cells being configured to the first communication system may be acquired based on a bandwidth that is supported by the first communication system. And, the number of cells being configured to the second communication system may be acquired based on a bandwidth that is supported by the second communication system. Since the 5G NR system supports a wider bandwidth than the LTE system, the number of cells being configured to the first communication system may be greater than the number of cells being configured to the second communication system.

Figure 7:
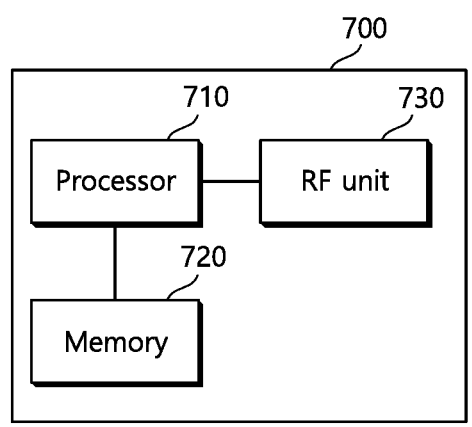
FIG. 7 is a block diagram showing a wireless device to which an exemplary embodiment of this specification can be applied.

FIG. 7 is a block diagram showing a wireless device to which an exemplary embodiment of this specification can be applied.

Referring to FIG. 7, as a device (or apparatus) that can implement the above-described exemplary embodiment, the wireless device may operate as a base station or user equipment (UE). Additionally, the wireless device may correspond to a receiving device, or the wireless device may correspond to a transmitting device transmitting a signal to the receiving device.

As shown in the drawing, the wireless device of FIG. 7 includes a processor (710), a memory (720), and a transceiver (730). Each of the processor (710), memory (720), and transceiver (730) shown in FIG. 7 may be implemented as a separate chip, or at least two or more blocks/functions may be implemented through a single chip.

The transceiver (730) is a device including a transmitter and a receiver, and when a specific operation is performed, the transceiver (730) may perform the operations of any one of the transmitter and the receiver, or the transceiver may perform the operations of both the transmitter and the receiver. The transceiver (730) may include one or more antennas transmitting and/or receiving radio signals. Additionally, the transceiver (730) may include an amplifier for amplifying a reception signal and/or a transmission signal and a band-pass filter for performing transmission over a specific frequency band.

The processor (710) may implement functions, processes, and/or methods proposed in this specification. For example, the processor (710) may perform operations according to the above0described exemplary embodiment of this specification. More specifically, the processor (710) may perform the operations disclosed in the exemplary embodiment shown in FIG. 1 to FIG. 6.

The processor (710) may include an application-specific integrated circuit (ASIC), a separate chipset, a logic circuit, a data processing unit, and/or a converter inter-converting baseband signals and radio signals. The memory (720) may include a read-only memory (ROM), a random access memory (RAM), a flash memory, a memory card, a storage medium, and/or other equivalent storage devices.

Figure 8:
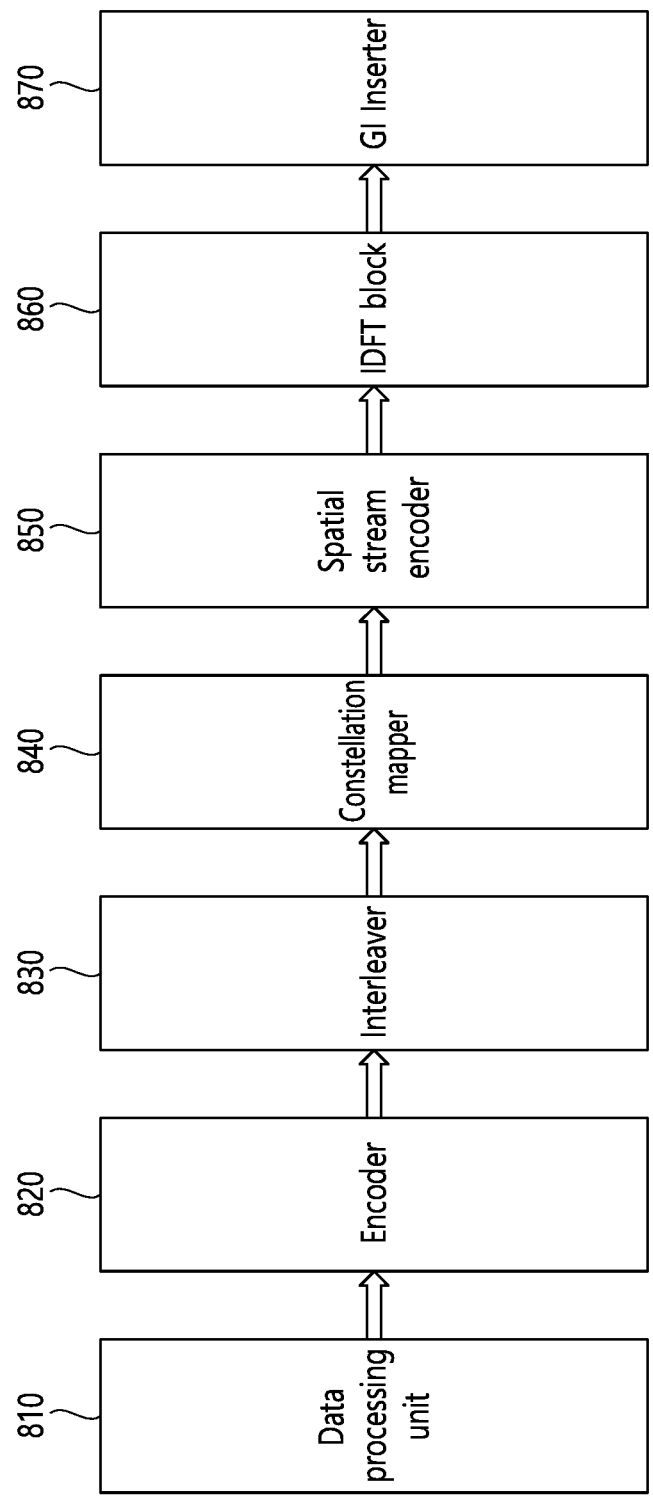
FIG. 8 is a block diagram showing an example of a device being included in a processor.

FIG. 8 is a block diagram showing an example of a device being included in a processor. For simplicity in the description, although an example of FIG. 8 is described based on a block for a transmission signal, it will be apparent that a reception signal may be processed by using the corresponding block.

A data processing unit (810) shown in FIG. 8 generates transmission data (control data and/or user data) corresponding to a transmission signal. An output of the data processing unit (810) may be inputted to an encoder (820). The encoder (820) may perform coding by using binary convolutional code (BCC) or low-density parity-check (LDPC) coding schemes. At least one encoder (820) may be included herein, and the number of encoders (820) may be determined based on diverse information (e.g., number of data streams).

An output of the encoder (820) may be inputted to an interleaver (830). The interleaver (830) may perform operations of distributing consecutive bit signals within a radio resource (e.g., time and/or frequency) in order to prevent any burst error, which is caused by fading, and so on. At least one interleaver (830) may be included herein, and the number of interleavers (830) may be determined based on diverse information (e.g., number of spatial streams).

An output of the interleaver (830) may be inputted to a constellation mapper (840). The constellation mapper (840) may perform constellation mapping, such as biphase shift keying (BPSK), Quadrature Phase Shift Keying (QPSK), n-quadrature amplitude modulation (QAM), and so on.

An output of the constellation mapper (840) may be inputted to a spatial stream encoder (850). The spatial stream encoder (850) performs data processing in order to transmit a transmission signal via at least one spatial stream. For example, the spatial stream encoder (850) may perform at least one of space-time block coding (STBC), Cyclic shift diversity (CSD) insertion, and spatial mapping on the transmission signal.

An output of the spatial stream encoder (850) may be inputted to an IDFT (860) block. The IDFT (860) block may perform inverse discrete Fourier transform (IDFT) or inverse Fast Fourier transform (IFFT).

An output of the IDFT (860) block is inputted to a Guard Interval (GI) inserter (870), and an output of the GI inserter (870) is inputted to the transceiver (730) of FIG. 7.

What is claimed is:

1. A method for transmitting a transport block in a wireless communication system, comprising:
   receiving, by a user equipment (UE), information on a number of subcarriers of a partial band being included in a carrier that is allocated by a base station;
   distributing, by the UE, a soft buffer belonging to the UE in proportion to a number of subcarriers of the partial band;
   determining, by the UE, a transport block size per partial band based on a size of the distributed soft buffer; and
   transmitting a transport block, to the base station, within the transport block size.

2. The method of claim 1, wherein, if a bandwidth of the partial band is constant and a gap between the subcarriers is increased, a number of subcarriers of the partial band is decreased, a size of the soft buffer being distributed to the partial band is decreased, and a transport block size being transmitted from the partial band is decreased.

3. The method of claim 1, wherein, if a bandwidth of the partial band is increased and a gap between the subcarriers is constant, a number of subcarriers of the partial band is increased, a size of the soft buffer being distributed to the partial band is increased, and a transport block size being transmitted from the partial band is increased.

4. The method of claim 1, wherein, in case the partial band includes a first partial band and a second partial band, a sum of a bandwidth of the first partial band and a bandwidth of the second partial band is equal to or greater than a bandwidth of the carrier.

5. The method of claim 1, wherein, in case the partial band includes a first partial band and a second partial band, a sum of a number of subcarriers in the first partial band and a number of subcarriers in the second partial band is equal to or greater than a number of subcarriers in the carrier.

6. The method of claim 5, wherein the first partial band supports enhanced Mobile BroadBand (eMBB) services, and
   wherein the second partial band supports Ultra-Reliable and Low Latency Communications (URLLC).

7. The method of claim 1, wherein the soft buffer belonging to the UE is distributed in proportion to a number of Orthogonal Frequency Division Multiplexing (OFDM) symbols being scheduled in the partial band, and
   wherein the number of OFDM symbols being scheduled in the partial band is received via higher layer signal.

8. The method of claim 1, wherein the soft buffer belonging to the UE is distributed in proportion to a number of Hybrid Automatic Repeat request (HARQ) processes of the partial band, and
   wherein the number of HARQ processes is received via UE-specific signal.

9. The method of claim 1, wherein the soft buffer belonging to the UE is distributed in proportion to a maximum number of information bits being supported by a maximum modulation scheme of the partial band.

10. The method of claim 1, wherein the soft buffer belonging to the UE is distributed in inverse proportion to a minimum coding rate being applied to the partial band, and
    wherein the minimum coding rate is received via UE-specific signal.

11. The method of claim 1, wherein, in case multiple carriers are allocated from the base station, the soft buffer belonging to the UE is distributed in proportion to a number of subcarriers of the carrier, before the soft buffer is distributed in proportion to a number of subcarriers of the partial band.

12. The method of claim 1, wherein the UE is simultaneously connected to a first communication system and a second communication system,
    wherein, based on a number of cells being configured to the first communication system and a number of cells being configured to the second communication system, the soft buffer belonging to the UE is distributed to each of the first communication system and the second communication system,
    wherein the number of cells being configured to the first communication system is acquired based on a bandwidth being supported by the first communication system, and
    wherein the number of cells being configured to the second communication system is acquired based on a bandwidth being supported by the second communication system.

13. A user equipment transmitting a transport block in a wireless communication system, comprising:
    a transceiver transmitting or receiving radio signals; and
    a processor controlling the transceiver,
    wherein the processor:
    receives information on a number of subcarriers of a partial band being included in a carrier that is allocated by a base station,
    distributes a soft buffer belonging to the UE in proportion to a number of subcarriers of the partial band,
    determines a transport block size per partial band based on a size of the distributed soft buffer, and
    transmits a transport block, to the base station, within the transport block size.

* * * * *